(12) United States Patent
Konzelmann et al.

(10) Patent No.: US 7,252,015 B2
(45) Date of Patent: Aug. 7, 2007

(54) ULTRASONIC FLOW METER INCLUDING GUIDE ELEMENTS

(75) Inventors: Uwe Konzelmann, Asperg (DE); Tobias Lang, Stuttgart (DE); Christoph Gmelin, Stuttgart (DE); Sami Radwan, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/304,181

(22) Filed: Dec. 14, 2005

(65) Prior Publication Data

US 2006/0156828 A1    Jul. 20, 2006

(30) Foreign Application Priority Data

Dec. 14, 2004    (DE)    ............ 10 2004 060 065

(51) Int. Cl.
*G01F 1/66*    (2006.01)
(52) U.S. Cl. .................................... 73/861.25
(58) Field of Classification Search ............... None
See application file for complete search history.

(56) References Cited

U.S. PATENT DOCUMENTS 6,330,831 B1 * 12/2001 Lynnworth et al. ...... 73/861.28

FOREIGN PATENT DOCUMENTS

| EP | 0 477 418 A1 | 4/1992 |
| GB | 1 541 419 | 2/1979 |
| GB | 2 101 318 | 1/1983 |
| JP | 59100820 | 6/1984 |

\* cited by examiner

*Primary Examiner*—Harshad Patel
(74) *Attorney, Agent, or Firm*—Kenyon & Kenyon LLP

(57) ABSTRACT

The measurement of volume flows or mass flows in the intake system of motor vehicle internal combustion engines plays a significant role in reducing pollutant emissions. Therefore, an ultrasonic flow meter for measuring a flow rate of a fluid flowing in a primary flow direction is described. The ultrasonic flow meter has at least two ultrasonic transducers, the ultrasonic transducers being capable of emitting and/or receiving ultrasonic waves at an angle α to the primary flow direction which is different from 90°. Furthermore, the ultrasonic flow meter has at least one guide element which is entirely or partially situated in the fluid. This guide element diverts at least one part of the flowing fluid in such a way that in the diversion, a velocity component is transferred to at least one part of the flowing fluid perpendicular to the primary flow direction. Guide vanes or displacers in particular are described as guide elements. In addition, turbulators may be provided on the guide elements, the turbulators generating a longitudinal fluid bed along the guide elements and thus causing the flow of the fluid to have a better contact with the guide elements when flowing around them. This reduces turbulences within the ultrasonic flow meter. Compared to the devices known from the related art, the ultrasonic flow meters described are distinguished by an improved signal-to-noise ratio and accordingly by a higher measuring precision.

12 Claims, 6 Drawing Sheets

ULTRASONIC FLOW METER INCLUDING GUIDE ELEMENTS

FIELD OF THE INVENTION

Ultrasonic flow meters are used in the automotive industry, in particular in the intake system of internal combustion engines, for measuring volume flow or mass flow. Typically ultrasonic transducers are used which are capable of both emitting ultrasonic waves into a fluid and receiving ultrasonic waves. The propagation time of ultrasonic signals which are transmitted from an emitter to a receiver is influenced by the flow of the fluid. It is possible to infer the flow velocity of the fluid from the degree of influence of the propagation time.

BACKGROUND INFORMATION

British Published Patent Application No. 2 101 318 describes an ultrasonic flow meter in which two ultrasonic transducers are mounted on opposite sides of a pipe through which a fluid (112) flows. The transducers are situated slightly offset with respect to one another, so that ultrasonic waves emitted by one transducer and received by the second transducer propagate at an angle to the flow direction of the fluid which is different from 90°.

In addition to the system described in British Published Patent Application No. 2 101 318, ultrasonic flow meters are also known in which ultrasonic waves emitted by an ultrasonic transducer are initially reflected one time or multiple times before they are received by a second ultrasonic transducer situated on the same side of the pipe through which the fluid flows as the first ultrasonic transducer. Such systems are described, for example, in European Published Patent Application No. 0 477 418, in British Published Patent Application No. 1 541 419 and in Japanese Published Patent Application No. 59100820. In European Published Patent Application No. 0 477 418 A1, a unit made up of two ultrasonic transducers and one reflector system is integrated into a coherent unit which may be installed in a measuring tube.

FIG. 1 shows the operating principle of these measuring systems corresponding to the related art. A fluid 112, for example, air, flows through a flow pipe 110 in an essentially laminar flow at a flow velocity $V_{FL}$ 114. Two ultrasonic transducers 116 and 118 are mounted on opposite sides of flow pipe 110 in such a way that first ultrasonic transducer 116 is able to emit ultrasonic waves, which may be received by second ultrasonic transducer 118, these ultrasonic waves propagating at a velocity $V_{UL}$ 120 at an angle α to flow velocity 114 which is different from 90°. In the system depicted here, the ultrasonic waves of ultrasonic transducer 116 propagate toward ultrasonic transducer 118 at a velocity $V_{UL,1}$ which is higher than in an unmoving fluid 112 due to the motion of fluid 112 at velocity 114.

$$V_{UL,1} = V_{UL} + V_{FL} \cdot \cos \alpha \quad (1)$$

$V_{UL}$ stands for the propagation velocity of the ultrasonic waves in an unmoving fluid. In contrast, if ultrasonic waves are emitted by ultrasonic transducer 118 and received by ultrasonic transducer 116, these waves propagate at a velocity $V_{UL,2}$ which is lower than propagation velocity $V_{UL}$ in unmoving fluid 112.

$$V_{UL,2} = V_{UL} - V_{FL} \cdot \cos \alpha \quad (2)$$

Comparing a propagation time $t_1$ which a signal needs from ultrasonic transducer 116 to ultrasonic transducer 118 with a propagation time $t_2$ which an ultrasonic signal needs from ultrasonic transducer 118 to ultrasonic transducer 116 allows flow velocity $V_{FL}$ 114 of the fluid to be determined:

$$v_{FL} = \frac{L}{2 \cdot \cos \alpha} \cdot \left( \frac{1}{t_1} - \frac{1}{t_2} \right) \quad (3)$$

A similar calculation of flow velocity $V_{FL}$ may also be performed for reflection systems such as described in EP 0 477 418 A1, for example.

The systems described in the related art, however, all have the problem that angle α in FIG. 1 must be sufficiently small for a successful flow measurement, but at least substantially smaller than 90°. This results in the problem that it is not possible to fit the surfaces of ultrasonic transducers 116, 118 flush to the inside surface of flow pipe 110. Protrusions 122 are thus formed in flow pipe 110 in the area of ultrasonic transducers 116, 118, which result in turbulences and flow separations. These turbulences cause pressure fluctuations and may result in interfering signal contributions which are superimposed on the actual ultrasonic signals as noise.

Another disadvantage of these turbulences and flow separations is that contaminants or particles such as dust, oil, or water droplets contained in the flowing medium tend to be deposited in the turbulence zones. One possible remedy is to insert wedge-shaped adaptor elements which fill up protrusions 122 of flow pipe 110 but are permeable to ultrasonic waves. However, the disadvantage here is that the layer thickness of the wedge-shaped adaptor elements varies over the cross section of an emitted ultrasound beam. This makes resonance adjustment for efficient ultrasound injection into the flowing medium difficult. Furthermore, such a construction responds sensitively to structure-borne noise injected into flow pipe 110.

SUMMARY OF THE INVENTION

The present invention therefore provides an ultrasonic flow meter for measuring the volume flow and/or the mass flow of a fluid which may be used in particular in the intake system of a motor vehicle internal combustion engine.

The present invention is based on an ultrasonic flow meter corresponding to the related art for measuring a flow velocity of a fluid flowing in a main flow direction. At least two ultrasonic transducers are used, it being possible for the ultrasonic transducers to emit ultrasonic waves into the flowing fluid at an angle to the primary flow direction which is different from 90° or receive ultrasonic waves. The core of the present invention is that at least one guide element is situated in the fluid, diverting at least one part of the flowing fluid, and that in the diversion, a velocity component perpendicular to the primary flow direction is transferred to at least one part of the flowing fluid.

The present invention may be applied to both linear systems such as described, for example, in GB 2 101 318 A and reflection systems such as presented in EP 0 477 418 A1. EP 0 477 418 A1 describes how, for example, a reflection plate may be used as a guide vane for flow harmonization. Nonetheless, the present invention goes beyond this and uses at least one guide element, which is in particular able to divert the flow in such a way that the flow is optimally adapted to the protrusions described above which are caused by an ultrasonic transducer let into the wall of a flow pipe.

The guide elements may be implemented in different ways. Guide elements tilted in relation to the primary flow direction of the fluid have proven to be advantageous in particular. The guide elements, the tilted guide vanes in particular, may be situated in the fluid in a lamellar pattern, for example.

Furthermore, instead of guide vanes, it is advantageously possible to use displacers which, for example, locally narrow the flow cross section of the flow pipe.

Furthermore, the described system may also be entirely or partly integrated into an insertion sensor which may be used in the flow pipe. In this connection, in particular, one or multiple ultrasonic transducers as well as an electronic control unit may be integrated into the insertion sensor for activating and/or reading out at least one ultrasonic transducer. The electronic control unit for reading out at least one ultrasonic transducer may, for example, contain electronics for preprocessing received signals. Appropriate electronic plug-and-socket connections may also be integrated for contacting the insertion sensor. Furthermore, at least one reflection element having a reflection surface may be integrated into the insertion sensor, making it possible to implement, for example, one of the reflection systems described above. Advantageously, the at least one reflection element is inserted into the flow pipe in such a way that fluid is able to flow on both sides of the reflection surface along the reflection body. This has the advantage in particular that if the reflection element is not in contact with the wall of the flow pipe, water droplets that may be contained in the flow are precipitated on the flow pipe as a wall film before flowing through the insertion sensor, the wall film then being able to flow through the flow pipe without wetting or contaminating the reflection surface and thus interfering with the reflection.

DETAILED DESCRIPTION

Figure 1:
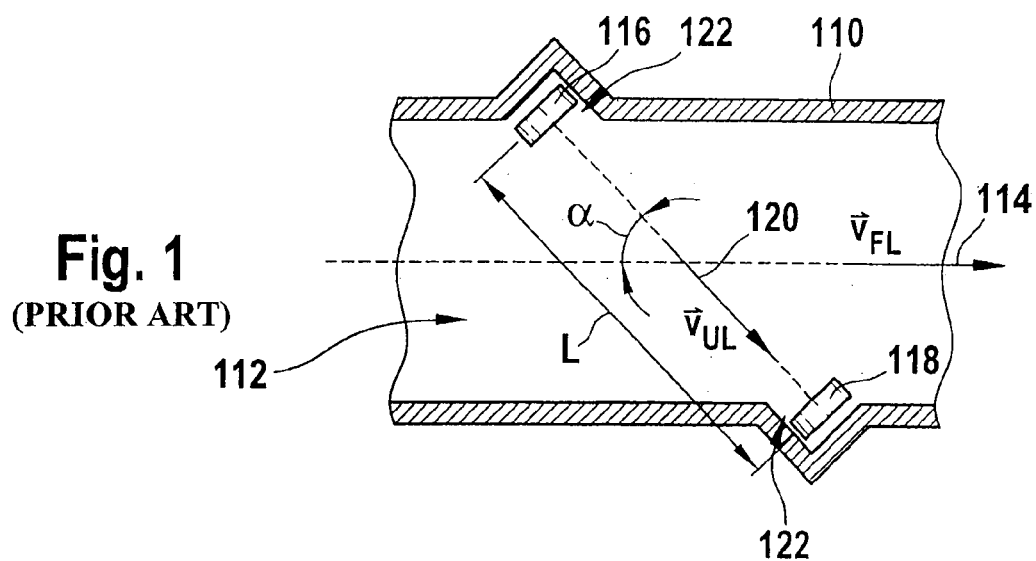
FIG. 1 shows a schematic diagram of a system for ultrasonic flow measuring.
Figure 2A:
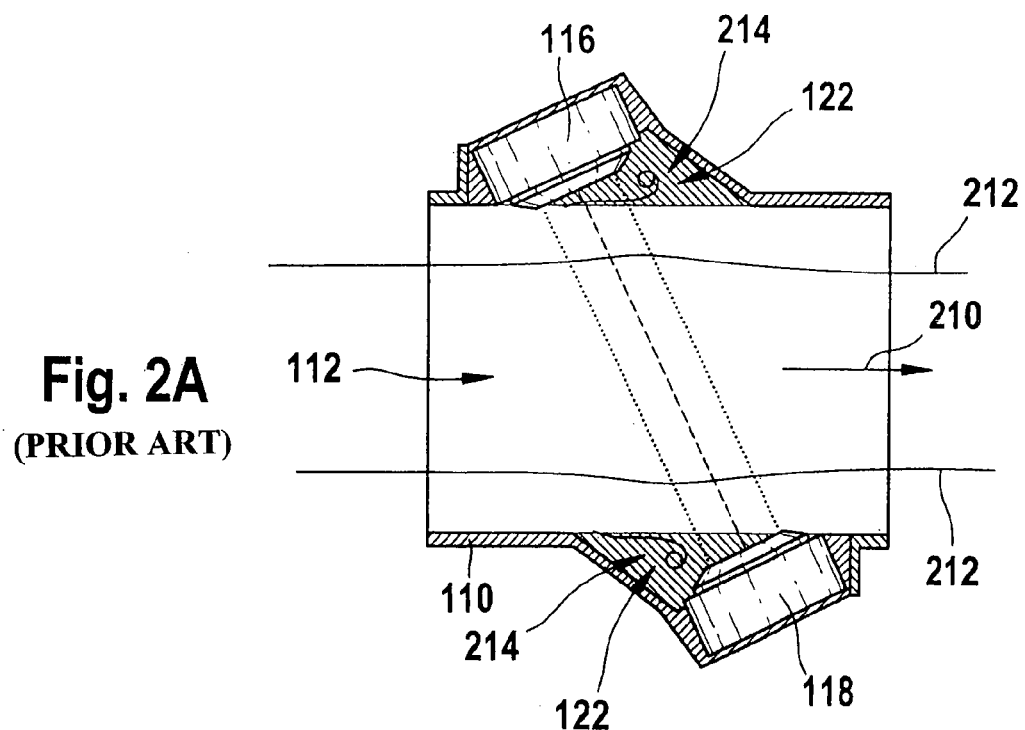
FIG. 2A shows a system for ultrasonic flow measuring according to the related art having two diametrically opposed ultrasonic transducers without guide elements.

Similarly to FIG. 1, FIG. 2A shows an additional system having two diametrically opposed ultrasonic transducers 116, 118 which, in a direction transverse to primary flow direction 210 (i.e., parallel to flow velocity 114 in FIG. 1), are capable of exchanging ultrasonic waves at an angle to primary flow direction 210 which is different from 90°. As an example, FIG. 2A shows two flow lines 212 of the fluid. The flow of the fluid in the tube is predominantly free from separation areas.

The two ultrasonic transducers 116, 118 send signals to one another, the propagation times of which, as described above, allow a calculation of flow velocity $V_{FL}$ 114.

As shown in FIG. 2A, separation areas 214 are formed in the areas of the protrusions 122 upstream of ultrasonic transducers 116 and 118, within which laminar flow no longer prevails, but a turbulent flow prevails instead. One result of these turbulences is that the simple equation (1) (see above) for calculating the superimpositions of the velocities of ultrasonic wave $V_{UL}$ and of flow velocity $V_{FL}$ of the fluid no longer produce meaningful results because flow velocity $V_{FL}$ of the fluid is no longer unambiguously defined in these separation areas 214 in particular. Furthermore, significant pressure fluctuations within the fluid occur in these separation areas 214, as a result of which propagation velocity $V_{UL}$ of the ultrasonic waves in fluid 112 is able to fluctuate strongly. On the whole, these separation areas 214 which are localized immediately upstream from ultrasonic transducers 116 and 118 including the eddies formed there cause a severe worsening of the signal-to-noise ratio and accordingly a reduction of measuring precision. In addition, the width of these separation areas 214 may fluctuate strongly with the temperature of the flowing fluid. Using the system shown in FIG. 2A, it is only possible with great difficulty to obtain a drift-free and precise flow detection in an intake system of an internal combustion engine for the purpose of complying with stringent exhaust gas standards.

Figure 2B:
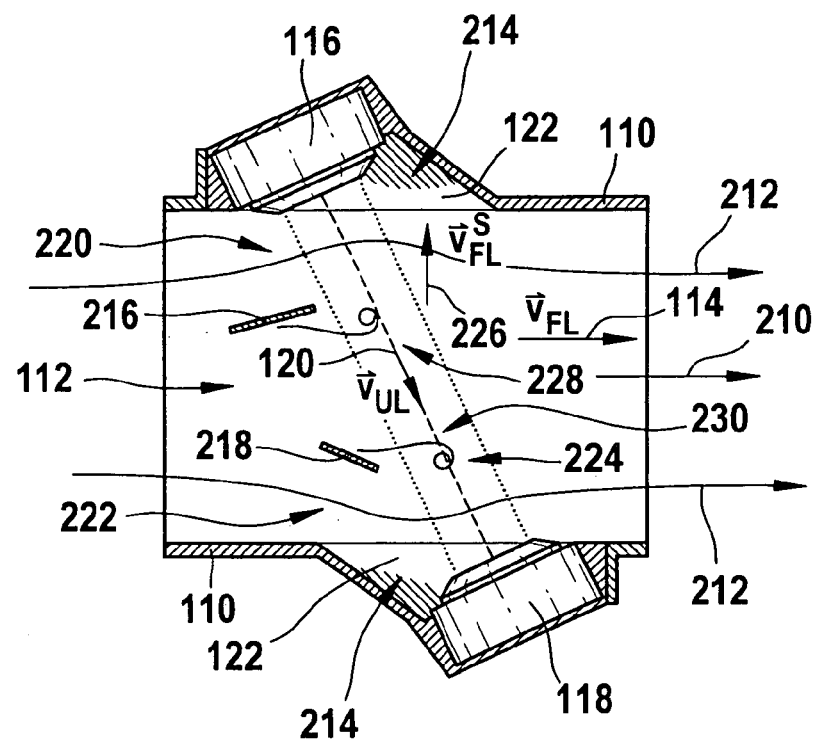
FIG. 2B shows a system for ultrasonic flow measuring having two diametrically opposed ultrasonic transducers having two guide vanes tilted against a primary flow direction of the fluid including a depiction of the separation areas.

In contrast, a modification according to the present invention of the measuring system of FIG. 2A is shown in FIG. 2B. In this embodiment according to the present invention, two guide vanes 216 and 218 are used, each of which is tilted in relation to primary flow direction 210 of the fluid and which diverts parts 220 and 222 of the flow of the fluid in the direction of ultrasonic transducers 116 and 118, respectively. This has the result that flow lines 212 in the vicinity of the wall of flow pipe 110 are more strongly adapted to the wall shape and protrusions 122 upstream from ultrasonic transducers 116 and 118. As a result, the flow velocity of the fluid receives a component $V^S_{FL}$ 226 perpendicular to primary flow direction 210 of the fluid, in the direction of ultrasonic transducers 116 and 118. As a result, separation areas 214 are strongly reduced in the area of protrusions 122, as can be seen in FIG. 2B. In this exemplary embodiment, separation areas 214 basically no longer project into wave area 224 which is necessary for an exchange of ultrasonic waves between ultrasonic transducers 116 and 118. This strongly improves the measuring precision of flow velocity 114. Such an improvement of measuring precision is not obtainable using the rectifier screens known from the related art, which are primarily elements parallel to primary flow direction 210, for example, a reflector body (see, for example, EP 0 477 418 A1), which is used only for homogenizing the flow.

Guide vanes 216 and 218 cause eddy areas 228 and 230, respectively, to be formed downstream of these elements, which lie in wave area 224 of ultrasonic transducers 116 and 118, it being possible for pressure fluctuations to occur within the eddy areas. However, these pressure fluctuations may be compensated by an integrative measuring characteristic of ultrasonic transducers 116 and 118 or a corresponding electronic control unit for reading out ultrasonic transducers 116 and 118. For that reason, eddy areas 228 and 230 in wave area 224 which are generated by guide vanes 216 and 218 do not result in a reduction of measuring precision.

The tilt angle of guide vanes 216 and 218 relative to primary flow direction 210 of the fluid were selected in such a way that the flow (i.e., flow lines 212) is in fact diverted slightly in the direction of ultrasonic transducers 116 and 118; however, it still has a sufficiently large component in the direction of propagation velocity $V_{UL}$. The result of this compromise is that it is still possible to implement the measuring system described above (which is no longer usable at an angle α=90° between flow velocity $V_{FL}$ 114 and propagation velocity $V_{UL}$ 120) of the ultrasonic waves.

As shown in FIG. 2B, guide vanes 216 and 218 are designed as flat bodies having straight, parallel edges, which is adequate for most applications. As an alternative, guide vanes 216 and 218 may be designed rounded or pointed or aerodynamically favorable for a uniform flow guidance on the particular upstream or downstream edges. Furthermore, guide vanes 216 and 218 may be designed to be curved or arched for a more specific guidance of the fluid, it also being possible, for example, to vary a material thickness of guide vanes 216 and 218 over one length of guide vanes 216 and 218, for example, similar to an airfoil of an airplane.

Figure 3:
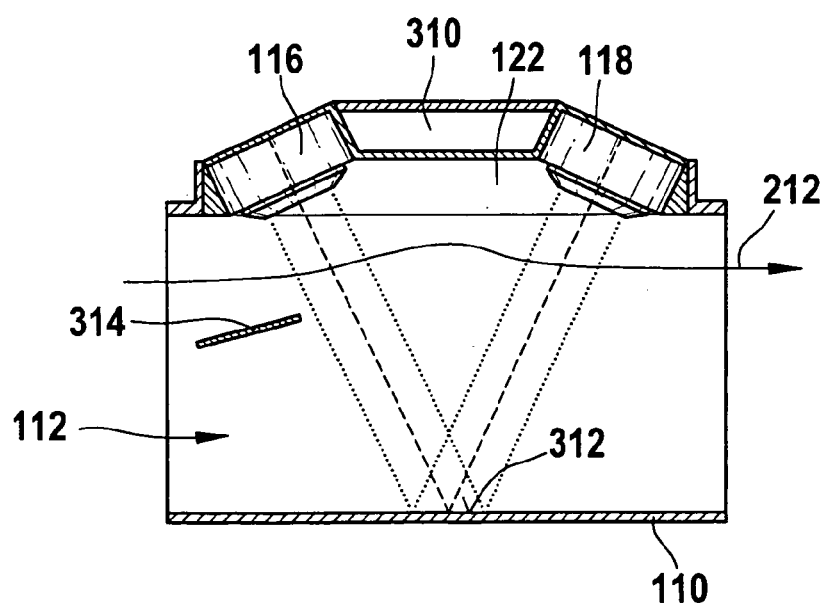
FIG. 3 shows a system for ultrasonic flow measuring having two ultrasonic transducers, a reflection surface and a guide vane tilted against the primary flow direction of the fluid.

As an alternative to the embodiment of the present invention shown in FIG. 2B having two diametrically opposed ultrasonic transducers 116 and 118, embodiments having reflection systems (see above) may also be used according to the present invention. An example of such an embodiment is shown in FIG. 3. Two ultrasonic transducers 116 and 118 are again used in this case; however, in this exemplary embodiment, they are integrated on the same side and tilted with respect to one another in one wall of a flow pipe 110. The tilting of ultrasonic transducers 116 and 118 again produces a protrusion 122, in which it is possible for separation areas 214 (not shown) to form. In this exemplary embodiment, a space 310 is situated between ultrasonic transducers 116 and 118, through which fluid 112 does not flow and which, for example, may be used for accommodating an electronic connecting device (for example, a plug-and-socket connection) and/or for placing an electronic control device for activating and/or reading out at least one of ultrasonic transducers 116, 118. For example, it is possible for the signals generated by ultrasonic transducers 116 and 118 to be preprocessed in this electronic control unit. Complete processing of the signals is also possible.

Furthermore, the system in FIG. 3 has a reflection surface 312 on the wall of flow pipe 110, which is capable of reflecting ultrasonic signals of ultrasonic transducers 116, 118. For example, the wall material of flow pipe 110 may have adequate reflection properties for ultrasonic waves. In addition, however, the inside wall of the flow pipe may also be provided with an additional coating in the area of reflection surface 312. Ultrasonic waves emitted by one of ultrasonic transducers 116, 118 are reflected on reflection surface 312 so that they may be received by the other ultrasonic transducer 116, 118. More complex reflection systems are also possible in which, for example, it is possible for ultrasonic waves to reflect multiple times on different reflection surfaces 312 before they reach the other ultrasonic transducer 116, 118. It is possible in this manner to increase, for example, the propagation time differences and accordingly the measuring precision.

A guide vane 314 is again provided in this exemplary embodiment which deflects one part of the flow of fluid 112 toward ultrasonic transducers 116, 118 or toward protrusion 122. Again, the formation of a separation area 214 (not shown here) upstream from ultrasonic transducers 116, 118 is prevented or reduced in the area of protrusion 122, and thus the signal quality and the measuring precision of the ultrasonic flow measuring is considerably improved.

Figure 4:
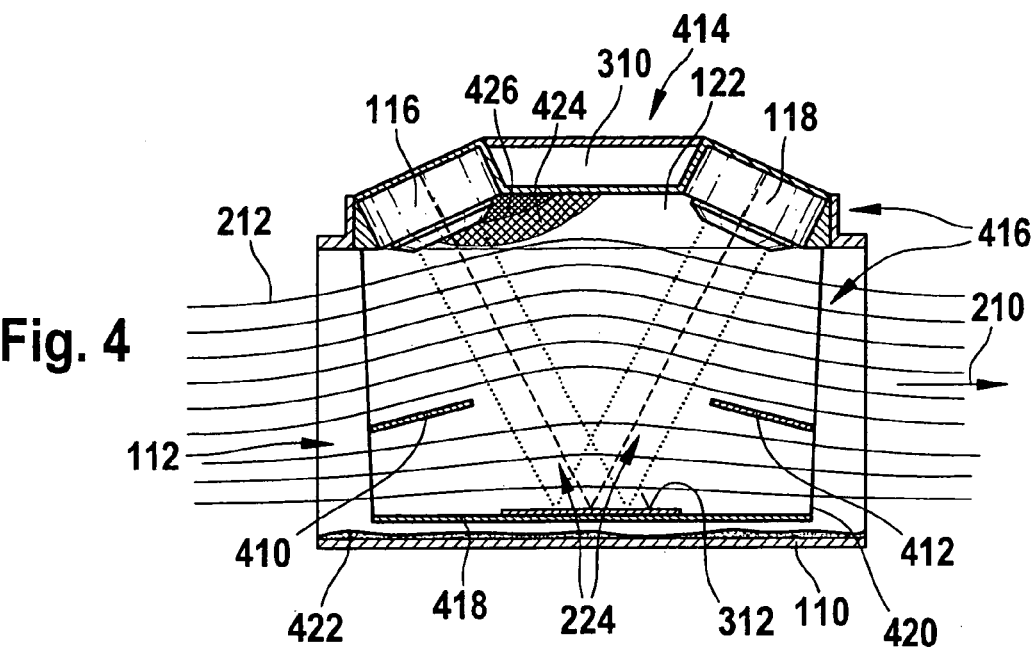
FIG. 4 shows an embodiment alternative to FIG. 3 of a system integrated into an insertion sensor having two guide vanes tilted against the primary flow direction of the fluid.

FIG. 4 shows an alternative embodiment to the system in FIG. 3 in which two guide vanes 410 and 412 tilted against primary flow direction 210 of fluid 112 flowing through a flow pipe 110 are used. In this example, guide vanes 410 and 412 are again designed as elongated flat bodies having two long parallel, straight side walls. Curved guide vanes could also be used as an alternative, which adapt better to the desired flow. In this exemplary embodiment, guide vane 410 takes over the task of providing a velocity component 226 to fluid 112 perpendicular to protrusion 122, as a result of which the flow is better adapted to the wall shape of the system. Second guide vane 412 is used to adapt the flow again to primary flow direction 210 after flowing through ultrasonic flow meter 414.

Flow pipe 110 may have, for example, a rectangular or round or oval cross section and, for example, be designed as a cylinder. A reflection system is again used in this exemplary embodiment similarly to FIG. 3. In this case, however, the components of ultrasonic flow meter 414 are integrated into an insertion sensor 416. Insertion sensor 416 includes both ultrasonic transducers 116 and 118, space 310 lying between them, which, corresponding to the exemplary embodiment described in FIG. 3, for example, may be used for the integration of an electronic connecting device and/or an electronic control unit (as a result of which the electronic connecting device and the electronic control unit become components of insertion sensor 416) as well as a reflection element 418, which is provided with a reflection surface 312. Furthermore, insertion sensor 416 has a mount 420 which connects the individual components and aligns them with one another. In this exemplary embodiment, guide vanes 410 and 412 are also affixed by mount 420 of insertion sensor 416 and make up an integral component of insertion sensor 416.

Ultrasonic transducers 116 and 118 send ultrasonic waves to one another across wave area 224, the ultrasonic waves which are emitted by one of ultrasonic transducers 116, 118 being reflected on reflection surface 312 before each reaches the other ultrasonic transducer 116, 118. Reflection element 418 is situated in flow pipe 110 in such a way that it is at a distance from a wall of flow pipe 110 and fluid 112 is able to flow around it on both sides. This distance between flow pipe 110 and reflection element 418 makes it possible for water droplets or other contaminants which may be contained in the flow to precipitate onto the wall of flow pipe 110 as wall film 422 before flowing through ultrasonic flow meter 414. This wall film 422 or the liquid contained in it may flow through flow pipe 110 without wetting reflection surface 312 and interfering with the reflection of the ultrasonic waves. In contrast to similar devices described in the related art (which, however have no guide vanes 410, 412), the device described including insertion sensor 416 has considerable advantages with respect to susceptibility to interference by liquids and contaminants.

Guide vanes 410, 412 integrated into insertion sensor 416 cause separation area 424, 426 to be strongly reduced in the area of protrusion 122. This is shown symbolically in FIG. 4 by reference numerals 424 and 426, 424 denoting the separation area without the use of guide vanes 410, 412, while reference numeral 426 denotes the separation area when guide vanes 410 and 412 are used. Interfering signals caused by separation area 424 and 426, respectively, are thus considerably reduced by using guide vanes 410, 412. It is not possible to achieve such a reduction through suitable flow guidance using the guide vanes for flow harmonization known from the related art alone, which have no adjustment angle in relation to primary flow direction 210, i.e., in particular through shaping of the mounts of a reflection plate.

Mount 420 of insertion sensor 416 may be designed in particular in such a way that it offers as little flow resistance as possible to the flow of fluid 112. To that end, mount 420 may in particular be made up of a plurality of webs which are shaped so as to have as little flow resistance as possible. Similarly, mount 420 may be designed in such a way that reflection element 418 together with reflection surface 312 and mount 420 form a dish-shaped unit. This dish-shaped unit may, for example, also have a plurality of openings via which fluid 112 outside of insertion sensor 416 is in connection with fluid 112 within insertion sensor 416. Reflection element 418 may be designed to be flat or curved, for example, for bundling of the ultrasonic waves.

Figure 5:
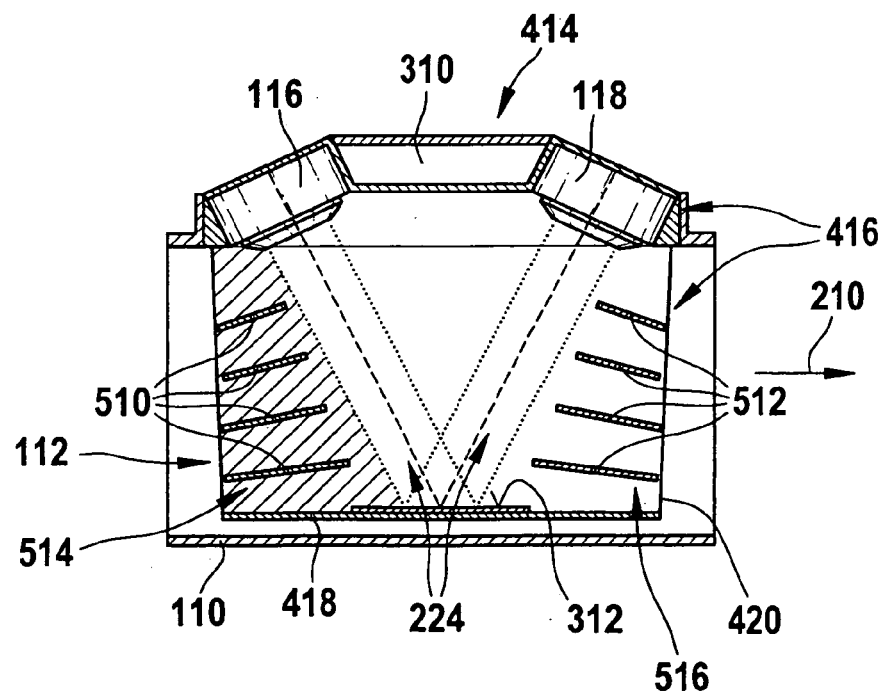
FIG. 5 shows an embodiment alternative to FIG. 4 having a plurality of guide vanes situated in a lamellar pattern and tilted against the primary flow direction of the fluid.

A preferred exemplary embodiment of an ultrasonic flow meter 414 designed as an insertion sensor 416 as an alternative to FIG. 4 is shown in FIG. 5. Instead of the two guide vanes 410 and 412, however, a plurality of guide vanes 510 and 512 are situated in a laminar pattern in this exemplary embodiment. Guide vanes 510 and 512, respectively, are again tilted in relation to primary flow direction 210 of the fluid, the tilt angle being larger the closer guide vanes 510, 512 are placed to ultrasonic transducers 116, 118 or to the side of the wall of flow pipe 110, on which ultrasonic transducers 116, 118 are situated. Guide vanes 510, 512 are thus approximately adapted to an idealized shape of flow lines 212 (not shown in FIG. 5).

In this exemplary embodiment each of guide vanes 510, 512 situated in a lamellar pattern is situated in a guide vane area 514 and 516, respectively, guide vane area 514 being indicated by shading in FIG. 5. These guide vane areas 514 and 516 are designed in this example in such a way that none of guide vanes 510, 512 projects into wave area 224, which would thus make it possible for them to interfere with the propagation of ultrasonic waves between ultrasonic transducers 116 and 118. For this purpose, guide vanes 510, 512 have not only different tilt angles relative to primary flow direction 210 of fluid 112 but also have a length which increases as the distance from ultrasonic transducers 116 and 118 increases. Compared to the related art and compared to the exemplary embodiment shown in FIG. 4, guide vanes 510, 512 designed in this way make it possible to obtain a flow which is more uniform, turbulence-free and low in separation, strongly increasing the measuring precision of the device.

Furthermore, reflection surface 312 in this exemplary embodiment is, as described above, provided with a coating. In particular, it is possible to use metallic or ceramic coatings that are good reflectors of ultrasonic waves. The reflection surface is advantageously designed to be flat and provided with a slight roughness. As described above, however, other embodiments are also possible. In selecting the reflection coating of reflection surface 312, it should be noted in particular that the propagation rate of ultrasonic waves in the medium of the reflection coating as well as the density of the reflection coating should be as different as possible from the corresponding material parameters in the flowing medium in order to optimize the reflective effect. Furthermore, reflection angle α (see FIG. 1) should be selected as a function of the material used for the reflection coating in such a way that as little of the sound energy as possible is converted into Rayleigh waves (surface waves).

To compensate for the usually non-optimally bundled transmission or receive characteristics of ultrasonic transducers 116, 118, it may be advantageous to provide reflection surface 312, as described above, with a slight curvature. Furthermore, parts of mount 420, reflection surface 312, and guide vanes 510, 512 or layers additionally applied to these components may be made from materials whose surfaces suppress a reflection of ultrasonic waves in order to avoid or suppress interfering signal echoes.

Figure 6A:
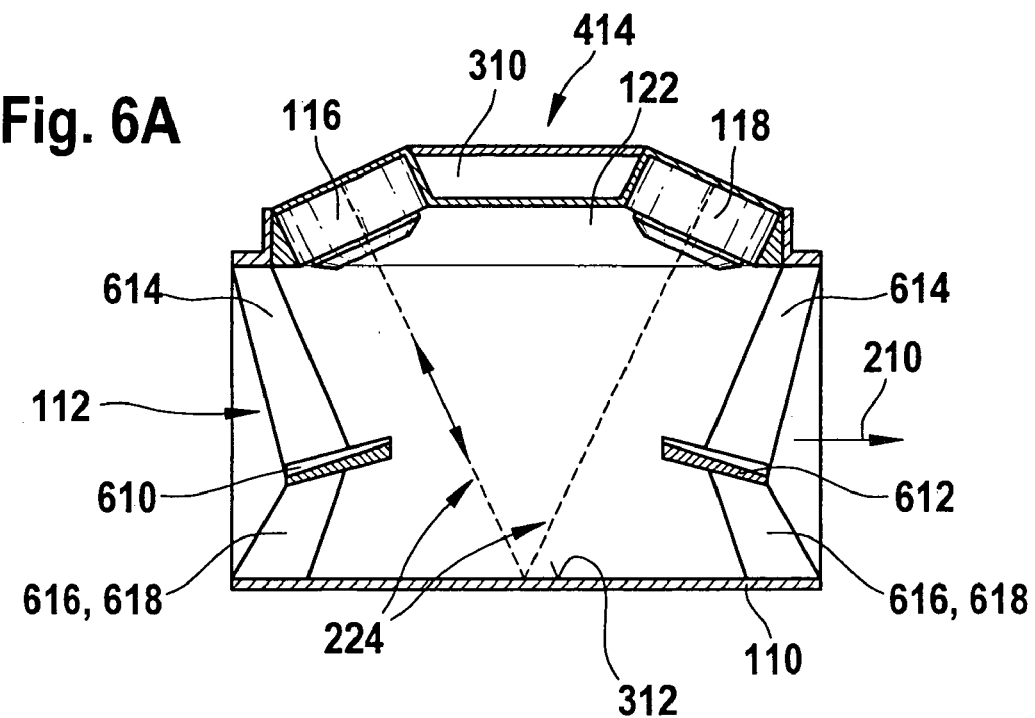
FIG. 6A shows a side view of an embodiment alternative to FIGS. 3 through 5 having complex guide elements.
Figure 6B:
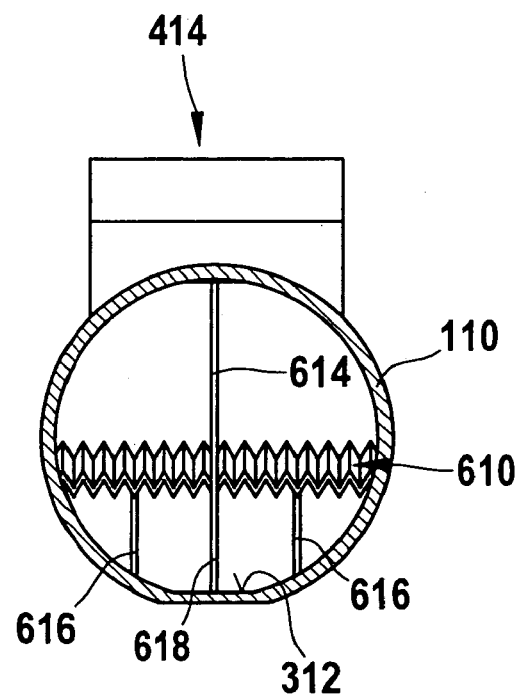
FIG. 6B shows a sectional depiction of the system according to FIG. 6A having a section plane perpendicular to the primary flow direction of the fluid.
Figure 6C:
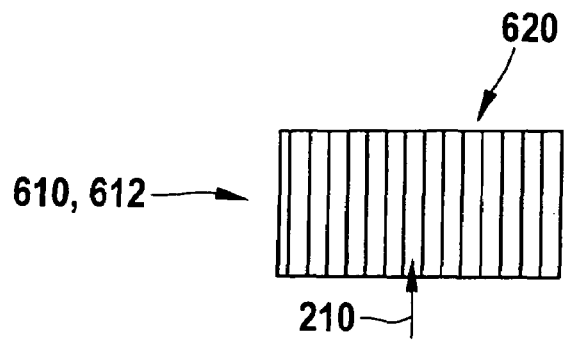
FIG. 6C shows a top view of a first embodiment of the complex guide elements according to FIGS. 6A and 6B.
Figure 6D:
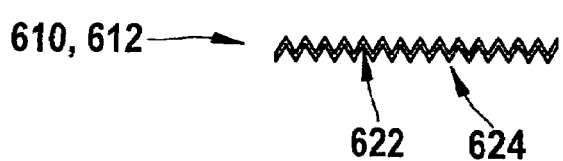
FIG. 6D shows a front view of the embodiment according to FIG. 6C.
Figure 6E:
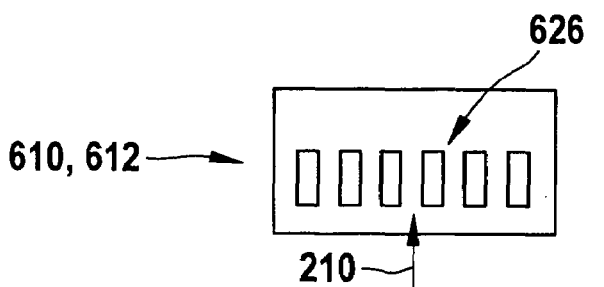
FIG. 6E shows a second embodiment of the complex guide elements according to FIGS. 6A and 6B.
Figure 6F:
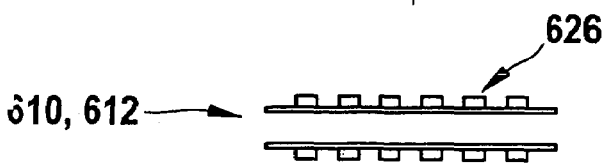
FIG. 6F shows a front view of the embodiment according to FIG. 6E.
Figure 6G:
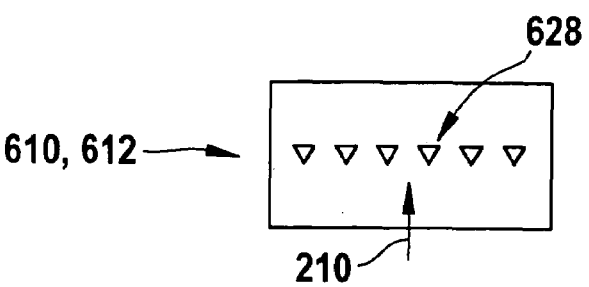
FIG. 6G shows a third embodiment of the complex guide elements according to FIGS. 6A and 6B.
Figure 6H:
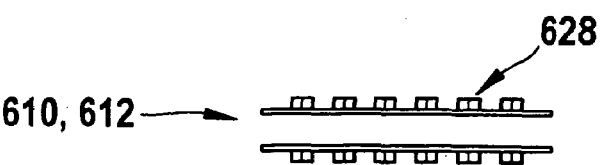
FIG. 6H shows a front view of the embodiment according to FIG. 6G.

Additional embodiments of an ultrasonic flow meter 414 are shown in FIGS. 6A through 6H as alternatives to FIGS. 3 through 5. Again, two guide elements 610 and 612 are introduced into a flow pipe 110 and tilted in relation to primary flow direction 210 of fluid 112, the two guide elements 610 and 612 in turn being positioned symmetrically to one another similarly to, for example, guide vanes 410 and 412 in FIG. 4. FIG. 6A shows a sectional depiction of ultrasonic flow meter 414 having a section plane parallel to primary flow direction 210; FIG. 6B shows a sectional depiction having a section plane perpendicular to primary flow direction 210. FIGS. 6C through 6H show various embodiments of guide elements 610 and 612, both as a top view (FIGS. 6C, 6E, 6G) and as a front view (FIGS. 6D, 6F, 6H). Guide elements 610, 612 are designed in such a way that backflows also flow through the flow pipe with as little formation of turbulence at the ultrasonic transducers as possible. For the mechanical attachment and stabilization of guide elements 610, 612, mounting plates 614, 616, 618 may be placed parallel to the flow direction. These mounting plates 614, 616, 618 have the additional effect of calming the flow of fluid 112 through flow pipe 110, thus reducing turbulences.

Guide elements 610, 612 may be designed differently, for example, they may be adapted to flowing fluid 112. FIGS. 6C and 6D show an embodiment in which guide element 610, 612 has a guide plate 620 having hills and valleys in profile (e.g., a "zigzag line") instead of a flat guide vane. Hills 622 and valleys 624 extend parallel to the particular flow lines at the location of guide elements 610, 612, thus producing "flow channels" which additionally stabilize the flow of fluid 112 through flow pipe 110 and prevent turbulences.

As an alternative, as shown in FIGS. 6E, 6F, 6G and 6H, "turbulators" 626, 628 may also be provided on one side or on both sides of guide elements 610, 612, it also being possible, for example, to situate the turbulators on a flat guide plate 620. As shown in FIGS. 6D and 6E, these turbulators 626, 628 may be, for example, situated at intervals and may be situated across primary flow direction 210, for example, at the top and/or at the bottom of guide elements 610, 612. These turbulators 626, 628 cause longitudinal eddy areas to form directly on the surface of guide elements 610, 612. The result of this effect is that separation areas (see, for example, reference numeral 228, 230 in FIG. 2B) which form in primary flow direction 210 are strongly reduced downstream from guide elements 610, 612. Overall, the formation of this longitudinal fluid bed around guide elements 610, 612 favors an essentially laminar flow guide elements 610, 612. The pressure fluctuations or eddy areas in wave area 224 of the ultrasonic metering is thus reduced, resulting in an improvement of the signal-to-noise ratio of the ultrasonic flow metering, thus strongly improving the measuring precision of the measurement of the flow velocity. Turbulators 626, 628 have a rectangular (see FIGS. 6E and 6F) or triangular (see FIGS. 6G and 6H) or also a polygonal, rounded or lamellar design, for example.

Figure 7:
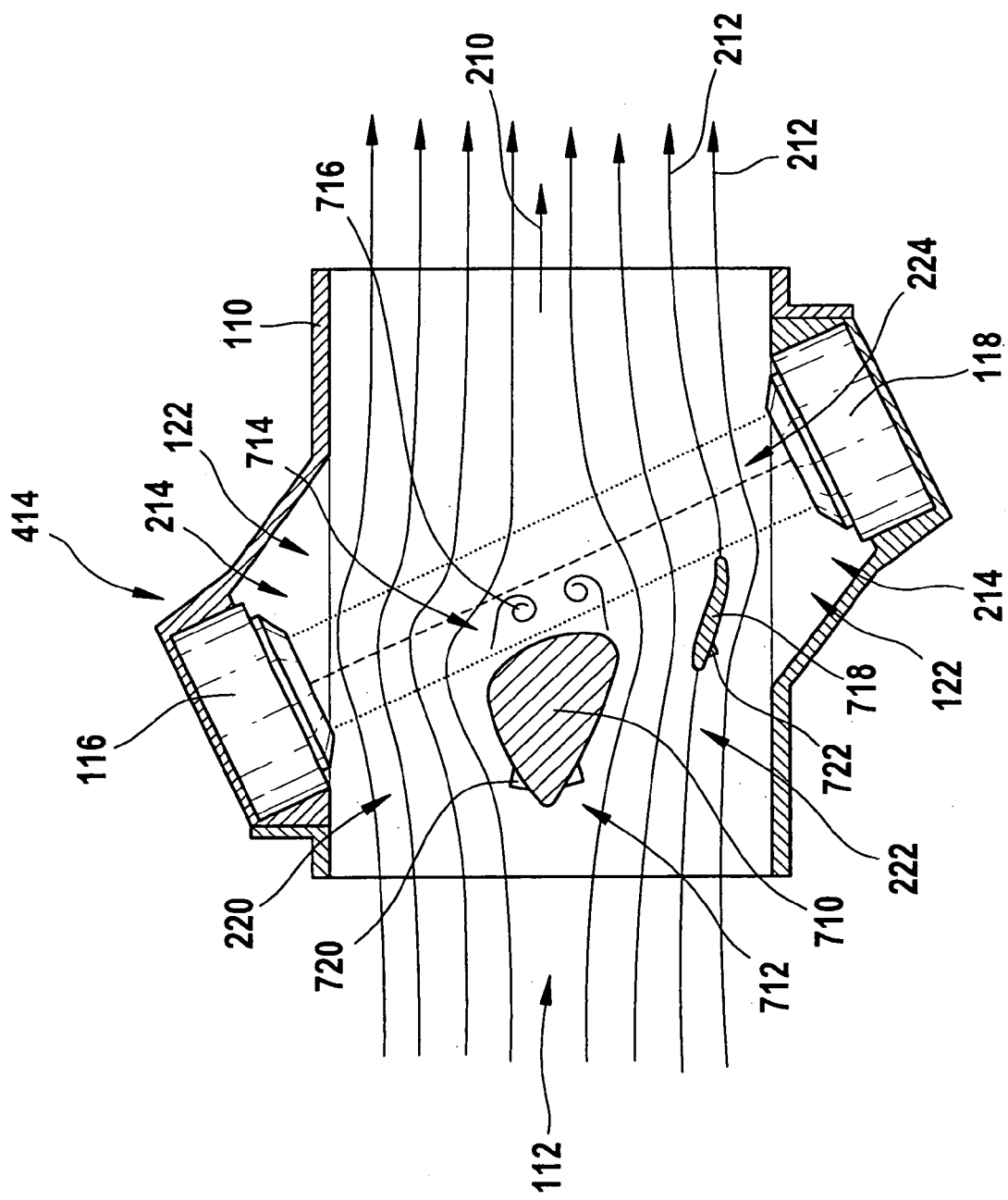
FIG. 7 shows a system for ultrasonic flow measuring having two diametrically opposed ultrasonic transducers including a displacer.

FIG. 7 shows another alternative embodiment of an ultrasonic flow meter 414 which, similarly, for example, to the embodiment shown in FIG. 2A and FIG. 2B, has two diametrically opposed ultrasonic transducers 116, 118 which are capable of exchanging ultrasonic signals at an oblique (see FIG. 1) angle α which is different from 90° to primary direction of flow 210 of a fluid flowing through a flow pipe 110. Based on the positioning of ultrasonic transducers 116, 118 oblique to primary direction of flow 210, protrusions 122 are again formed upstream from ultrasonic transducers 116, 118. Within these protrusions 112 separation areas 214 are formed, within which eddies and accordingly pressure and velocity fluctuations occur (see above).

In this exemplary embodiment, ultrasonic transducers 116, 118 each have a piezoceramic disc, which has a metallic coating on both sides and which is embedded in a vibration-damping plastic material. In the direction of flowing fluid 112, the piezoceramic disc is surrounded by a material whose characteristic acoustic impedance is adjusted to a value between the corresponding values for the piezoceramic material and the flowing medium. A suitable selection of thickness and geometric shaping of this material layer produces a resonance amplification and optimized transmission and receive characteristics of ultrasonic transducers 116, 118. Using an additional plastic material in relation to flow pipe 110 (or if integrated into an insertion sensor 416, in relation to a mount 420 of insertion sensor 416), the vibration damping system configuration described above is affixed in flow pipe 110. Electrical leads connected to a control and evaluation circuit are connected to the electrodes of the piezoceramic discs. The control and evaluation circuit and the electrical leads are not shown in FIG. 7. The unit made up of the piezoceramic discs and damping and impedance matching materials is denoted in FIG. 7 as ultrasonic transducer 116 or 118.

The exemplary embodiment shown in FIG. 7 eliminates the problem of the formation of separation areas 214 using, among other things, a displacer 710. This displacer 710 may, for example, be held in the interior of flow pipe 110 using one or multiple (not shown in FIG. 7) mounting plates 614 (see FIG. 6A, for example). Multiple displacers 710 may also be used instead of one single displacer 710. Displacer 710 locally reduces the cross section of flow pipe 110. This displaces the flow of fluid 112 more strongly into protrusions 122 upstream of ultrasonic transducers 116 and 118. This strongly reduces the size of separation areas 214 in these protrusions. After the fluid has flowed around the displacer, the cross section of flow pipe 110 is re-widened. As shown in FIG. 7, displacer 710 may be designed, for example, to be asymmetric in order to take into account the asymmetric configuration of ultrasonic transducers 116, 118. Because protrusion 122 upstream from ultrasonic transducer 116 in primary flow direction 210 appears earlier than protrusion 122 upstream from ultrasonic transducer 118, flow lines 212 in the upper area of flow pipe 110 must be deflected upwards in the direction of ultrasonic transducer 116 earlier than flow lines 212 in the lower area of flow pipe 110 which are diverted in the direction of ultrasonic transducer 118. Accordingly, displacer 710 in narrowing area 712 is shaped asymmetrically. Similarly, the opposite end of displacer 710 placed in primary flow direction 210 in widening area 714 of the flow is also shaped asymmetrically so as not to project into wave area 224 oriented obliquely to primary flow direction 210.

It is possible for turbulences 716 to occur in widening area 714 of the flow, in which part 220 of the flow displaced by displacer 710 toward ultrasonic transducer 116 and part 22 of the flow displaced toward ultrasonic transducer 118 flow together again. By analogy to the exemplary embodiment shown in FIG. 2B, these turbulences 716 are not, however, as detrimental to measuring the flow velocity to the same degree as turbulences in the area of separation areas 214. This is in particular due to the fact that relatively wide ultrasound beams are used, causing wave area 224 to be relatively wide. As a result, an average is calculated over the velocity differences of fluid 112 within these turbulences 716 across the width of wave area 224. In contrast, the amplitude of the pressure fluctuations locally on the surfaces of ultrasonic transducers 116, 118 is sharply reduced. Therefore, as a whole, the amplitude of the occurring signal interference diminishes strongly.

Furthermore, an additional guide element embodied as guide vane 718 is used in the exemplary embodiment shown in FIG. 7. As shown in FIG. 7, this guide vane 718 has a curved shape which is adapted to the shape of flow lines 212 of fluid 112 in this area. Guide vane 718 is situated in primary flow direction 210 "downstream" from displacer 710 in order to take into account the fact that protrusion 122 upstream from ultrasonic transducer 118 in the primary flow direction is situated after protrusion 122 upstream of ultrasonic transducer 116. As a result, in addition to the asymmetry of displacer 710 already described, the occurrence of turbulences is further reduced upstream from ultrasonic transducer 118.

Furthermore, in the embodiment shown in FIG. 7, additional turbulators 720 are affixed to displacer 710 in the narrowing area as are further turbulators 722 on the upstream side of guide vane 718 in relation to primary flow direction 210. Similarly to the exemplary embodiments in FIG. 6D and FIG. 6E, these turbulators 720, 722 may, for example, be designed as comb-like toothed structures. Similarly to the embodiment described in FIG. 6D and FIG. 6E, longitudinal eddy areas then primarily form along displacer 710 or guide vane 718. These result in an increased pulse exchange and accordingly reduce the subsequent separation areas, in particular turbulences 716 in widening area 714 downstream from displacer 710. This may generally result in an improved laminar flow around displacer 710 or guide vane 718 and the flow is stabilized. Turbulences 716 within wave area 224 of the ultrasonic waves are also reduced and the measuring precision is improved accordingly.

In FIG. 7, displacer 710 is used in combination with a measuring system in which ultrasonic transducers 116, 118 are located on diametrically opposed sides of flow pipe 110.

Similarly, it is possible, however, to use displacers 710 in multiple ways in flow pipe 110 as well as for reflection systems similarly to FIG. 3, for example.

LIST OF REFERENCE NUMERALS

110 Flow pipe
112 Fluid
114 Flow rate
116 First ultrasonic transducer
118 Second ultrasonic transducer
120 Propagation rate of the ultrasonic waves
122 Protrusion
210 Primary flow direction
212 Flow lines
214 Separation areas
216 Guide vane
218 Guide vane
220 Part of the flow
222 Part of the flow
224 Wave area
226 Component of the fluid rate perpendicular to the primary flow direction
228 Eddy area
230 Eddy area
310 Installation space
312 Reflection surface
410 Guide vane
412 Guide vane
414 Ultrasonic flow meter
416 Insertion sensor
418 Reflection body
420 Mount
422 Wall film
424 Separation area without guide vane
426 Separation area with guide vane
510 Guide vanes situated in a lamellar pattern
512 Guide vanes situated in a lamellar pattern
514 Guide vane area
516 Guide vane area
610 Guide element
612 Guide element
614 Mounting plates
616 Mounting plates
618 Mounting plates
620 Guide plate
622 Hills
624 Valleys
626 Turbulators
628 Turbulators
710 Displacer
712 Narrowing area
714 Widening area
716 Turbulences
718 Guide vane
720 Turbulators
722 Turbulators

What is claimed is:

1. An ultrasonic flow meter for measuring a flow velocity of a fluid flowing in a primary flow direction, comprising:
    at least two ultrasonic transducers capable of at least one of emitting and receiving an ultrasonic wave at an angle α to the primary flow direction that is different from 90°; and
    at least one guide element one of entirely and partially situated in the flowing fluid, wherein:
        the at least one guide element diverts at least one part of the flowing fluid in such a way that in the diversion, a velocity component perpendicular to the primary flow direction is imparted to the at least one part of the flowing fluid.

2. The ultrasonic flow meter as recited in claim 1, wherein:
    the ultrasonic wave from a first one of the at least two ultrasonic transducers can reach a second one of the at least two ultrasonic transducers in linear and reflection-free propagation.

3. The ultrasonic flow meter as recited in claim 1, further comprising:
    at least one reflection surface, wherein:
        the ultrasonic wave from a first one of the at least two ultrasonic transducers can reach a second one of the at least two ultrasonic transducers
        in linear propagation after at least one reflection on the at least one reflection surface.

4. The ultrasonic flow meter as recited in claim 1, wherein:
    the at least one guide element includes at least one guide vane tilted in relation to the primary flow direction.

5. The ultrasonic flow meter as recited in claim 1, wherein:
    at least a first guide element and a second guide element of the at least one guide element are situated in the flowing fluid in a lamellar pattern.

6. The ultrasonic flow meter as recited in claim 1, wherein the at least one guide element includes at least one displacer.

7. The ultrasonic flow meter as recited in claim 6, further comprising:
    a flow pipe through which the flowing fluid flows, wherein:
        the at least one displacer locally narrows a flow cross section of the flow pipe.

8. The ultrasonic flow meter as recited in claim 1, wherein:
    the at least one guide element includes at least one turbulator that generates a spatially limited eddy area in the flowing fluid in a vicinity of the at least one guide element.

9. The ultrasonic flow meter as recited in claim 1, wherein:
    at least one of the at least two ultrasonic transducers and the at least one guide element are integrated into an insertion sensor that can be inserted into a flow pipe.

10. The ultrasonic flow meter as recited in claim 9, further comprising:
    at least one electronic control unit integrated into the insertion sensor for at least one of activating and reading out at least one of the at least two ultrasonic transducers.

11. The ultrasonic flow meter as recited in claim 9, further comprising:
    at least one reflection element including at least one reflection surface and being integrated into the insertion sensor, wherein:
        the flow pipe includes at least one pipe wall, and the at least one reflection element in the insertion sensor inserted into the flow pipe is at a distance from the pipe wall in such a way that the flowing fluid can flow along the at least one reflection element on both sides of the at least one reflection surface.

12. The ultrasonic flow meter as recited in claim 9, wherein:
    for the purpose of reducing signal echoes, at least one of a component and a surface of the insertion sensor includes one of:
        a material that suppresses a reflection of the ultrasonic wave, and a layer that suppresses a reflection of the ultrasonic wave.

* * * * *